Dec. 4, 1923.　　　　　　　　　　　　　　　1,476,413
N. NORQUAL
FRONT AND FOUR-WHEEL DRIVE
Filed Aug. 11, 1919　　　　2 Sheets-Sheet 2
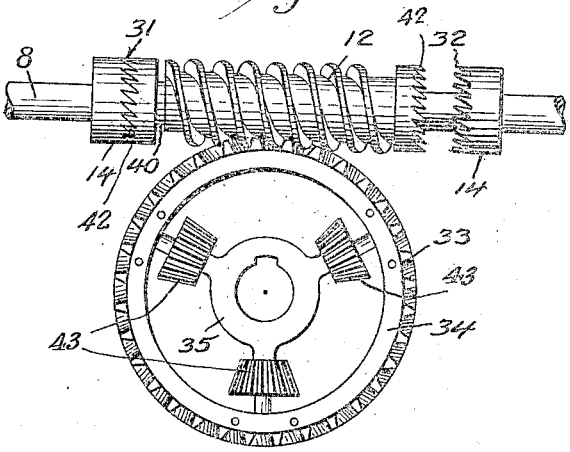
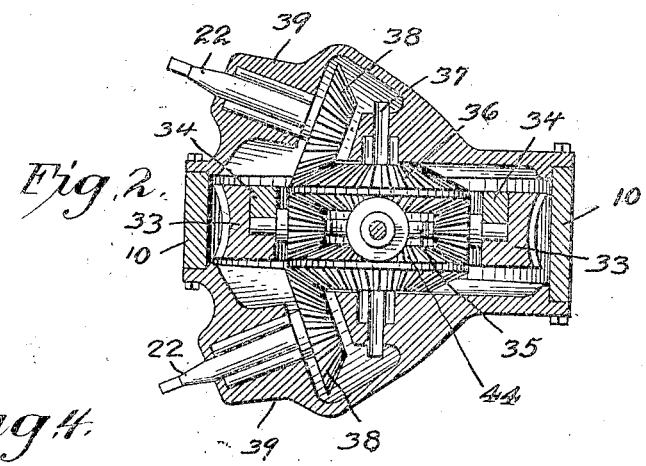
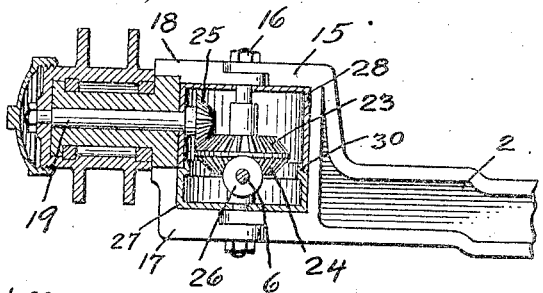
Inventor:
Nels Norqual Patented Dec. 4, 1923.

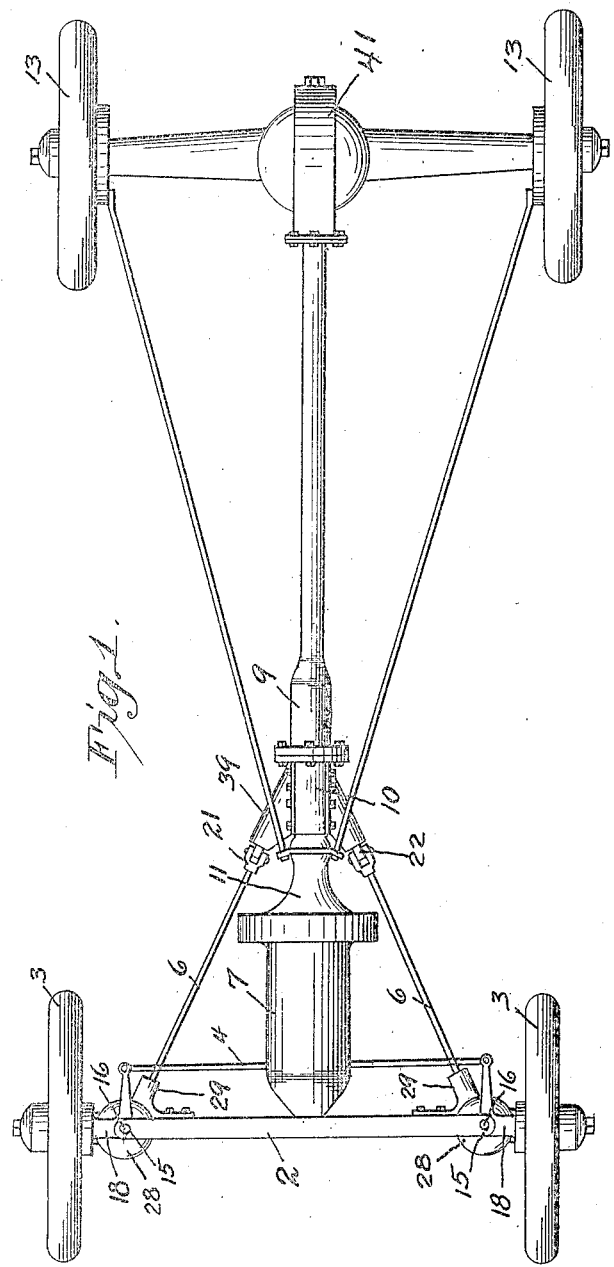

1,476,413

UNITED STATES PATENT OFFICE.

NELS NORQUAL, OF FLORA, NORTH DAKOTA.

FRONT AND FOUR WHEEL DRIVE.

Application filed August 11, 1919. Serial No. 316,874.

*To all whom it may concern:*

Be it known that I, NELS NORQUAL, a subject of the King of Norway, having declared my intentions of becoming a citizen of the United States, residing at Flora, Benson County, State of North Dakota, have invented certain new and useful Improvements in Front and Four Wheel Drives, of which the following is a specification.

This invention relates to a driving mechanism for turning the wheels of a vehicle, such as an automobile, and is particularly directed to a driving mechanism for the front wheels of such a vehicle. It is recognized that considerable advantage accrues from driving of four wheels as a greater tractive effort is secured when operating on soft or slippery roads and the front wheel drive is often desirable when making turns.

It is an object of this invention, therefore, to provide such a four wheel drive for a vehicle with differential mechanism for each set of wheels.

It is a further object of the invention to provide such a driving mechanism for the vehicle without disturbing the drive to the rear wheels or eliminating any of the advantages of the rear wheel drive and without any change in the location of the motor, front axle or rear differential housing being necessary. It is still another object of the invention to provide a drive for the rear wheels operating through a differential from the transmission shaft, which driving mechanism will be automatically disconnected temporarily when the transmission shaft is reversed.

It is still another object of the invention to provide such a driving device which is of simple construction and may be attached to a rear wheel driven vehicle making the same a four-wheel driven vehicle, which attachment can be made at small cost and with comparatively little effort.

These and other objects and advantages of the invention will be fully set forth in the following description made in connection with the accompanying drawings in which like reference characters refer to the same parts throughout the different views, and in which Fig. 1 is a plan view of the chassis of a motor driven vehicle embodying the invention;

Fig. 2 is a horizontal section through the differential casing used with the front wheel drive;

Fig. 3 is a view in elevation showing a portion of the driving mechanism; and

Fig. 4 is a vertical section through the wheel of the front axle and driving mechanism therefor.

Referring to the drawings, the vehicle is equipped with the usual motor 7 to which is connected the transmission enclosed in the casing 11 from which a driving shaft 8 extends rearwardly to the usual differential housing 41, through which the rear wheels 13 are driven in the usual manner. A differential housing 10 is provided secured to the housing 11 at its front end and having a flange at its rear end which is bolted to the flange of the housing 9 for the transmission shaft, which latter housing is bolted at its rear end to the rear transmission casing 41. The shaft 8 passes through the upper portion of the housing 10 and has slidably mounted thereon in said housing a spiral pinion or worm gear 12. This gear 12 is formed at its ends with heads from which project spaced spiral clutch teeth 42, the teeth on the respective heads at the end of said gear projecting in opposite directions. The shaft 8 has rigidly secured thereto in spaced relation to the ends a gear 12, collars 14, the inner or facing ends of which are also provided with spiral clutch or ratchet teeth corresponding, respectively, to the teeth on the heads 42 of the gear 12. The gear 12 is arranged in mesh with a worm wheel gear 33 of annular shape, said gear having fitted therein a ring 34 holding in place a spider 35 carried by said gear on which spider are disposed a plurality of pinions 43, shown as three in number. The pinions 43 mesh with bevel gears 44 carried on shafts 37, the ends of which are journaled in auxiliary housing sections 39 disposed at each side and bolted to the housing 10. The gears 44 are formed with gears 36 on their opposite faces, which latter gears are arranged to mesh with beveled gears 38 carried on the ends of shaft 22 extending rearwardly in inclined directions from the housing sections 39, being journaled therein and also being connected at their rear ends outside of said sections to shafts 6 by means of universal joints 21 and 22. It will be noted that the spider 35 and pinions 43 form with the gears 44 the usual type of differential driving mechanism. Shafts 22 are thus driven from the shaft 8 when one of the collars 14 has its teeth 31 or 32 engaging with one of the sets of the teeth on heads 42. The gear 12 is provided with an annular groove at one end adjacent one of the heads 42 adapted to be engaged by the usual clutch fork, not shown, operated by a lever, not shown, disposed in position for convenient operation by the driver of the vehicle.

The shafts 6 extend forwardly to the front axle 2 and are journaled at the front end in casing 29 bolted to said axle. The ends of axle 2 are bifurcated to provide spaced arms 15 having rabbetted ends provided with vertically alined openings adapted to receive a knuckle bolt 16. A steering knuckle 18 also has its ends rabbetted or offset to interengage with the ends of the arms 15 and said ends are also provided with alined openings through which the bolt 16 passes to pivotally connect said knuckle to the end of the axle. A beveled gear 24 has another beveled gear 23 formed on its opposite face and is journaled on the bolt 16. A pinion 26 secured to the end of shaft 6 meshes with the gear 24 and the gear 23, in turn, meshes with a beveled gear 25 secured to the end of a shaft or spindle 19, which spindle is adapted to drive the front wheel 3. It will be noted that the hub of the wheel 3 is mounted on the knuckle 18. The wheel 3 and spindle 19 thus swing about the axis of bolt 16 permitting the usual turning of the wheels. The gears in the end of axle 2 and knuckle 10 are enclosed by casings 27 and 28, the latter being connected to the knuckle 18 and mounted to move relatively to the casing 27, which latter is provided with a flange 30 forming a shoulder on which casing 28 rotates.

In operation, when the motor is running to drive the vehicle in a forward direction, the shaft 8 will be turned and the rear wheels driven to move the vehicle. The gear 33 will also be turned by the front wheels, the latter being turned by the movement of the vehicle. Said gear 12 will be moved longitudinally on the shaft 8 by the resistance of the gear 33 and the teeth on one of the heads 40 will come into engagement with the teeth on one of the collars 14, namely, the teeth 31, and owing to the end thrust on the gear 12 and the formation of the teeth, the said collar and gear will be connected for engagement. As soon as the gear moves into engagement with said collar the gear 33 will be driven and power will be transmitted through the differential formed by the pinions 43 and gears 44 and the shafts 22 and a turning movement transmitted to the front wheels. The power for driving the front wheels is thus taken off the transmission shaft and will in no way affect the driving of the rear wheels which will be driven through the usual differential gears in the housing 41.

When the shaft 8 is reversed through the transmission gearing the thrust of the wheel 12 against the gear 33 will move the gear 12 longitudinally and it will move out of engagement with the teeth 31 and travel endwise until it engages with the teeth 33 when it will once again be driven by shaft 8 and held in engagement with said teeth and will again transmit turning movement to the front wheels. The spiral teeth on gear 12 and collars 14 will readily be disengaged by the thrust of gear 33. By this action it is seen that the drive to the front wheels is automatically disconnected or discontinued momentarily whenever the transmission shaft 8 is reversed. This is a very desirable feature in such a motor driven vehicle.

From the above description it is seen that applicant has provided a very simple and efficient structure of front wheel drive and one that can be readily applied to practically every type of motor driven vehicle. The front wheels will be driven when the machine is traveling in either direction, but, as stated, will be momentarily disconnected when the transmission shaft is reversed.

It will, of course, be understood that various changes may be made in the details and arrangement of the parts without departing from the scope of applicant's invention, which, generally stated, consists in the matter shown and described and set forth in the appended claims.

What is claimed is:

1. A driving mechanism for the front wheels of a vehicle having also a rear wheel drive comprising, a transmission shaft extending from the transmission case to the driving mechanism for the rear wheel, a worm gear slidable on said shaft at an intermediate point, a worm driven differential gear mechanism operated by said worm gear and connected to driving means for the front wheels, means spaced at each end of said worm gear secured to said transmission shaft adapted to be engaged with either end of said worm gear whereby, upon movement of said shaft in opposite directions, said worm will be moved out of engagement with one of said means and into engagement with the other.

2. A wheel driving mechanism for a motor driven vehicle comprising, a transmission shaft adapted to be connected to and drive the rear wheels, driving means slidable on said shaft, a differential gear mechanism driven by said means and connected to drive the front wheels, and means secured to said transmission shaft at each end of said driving means and adapted to be clutched thereto, said driving means being constructed and arranged to be moved endwise by rotation of said transmission shaft to bring the same into engagement with one of said last mentioned means, whereby, when said transmission shaft is reversed, said driving means will move into engagement with the other of said last mentioned means.

3. A driving mechanism for a motor driven vehicle comprising, front and rear wheels having in combination, driving mechanism for said front wheels, a differential mechanism connected thereto, a transmission shaft, and means on said transmission shaft for driving said differential mechanism and for automatically and momentarily disconnecting the same from said shaft when said shaft is reversed.

4. The structure set forth in claim 3, said means comprising members secured to said shaft having ratchet teeth thereon and a member slidable on said shaft having ratchet teeth adapted, alternately, to engage with said members.

5. A driving mechanism for a four-wheeled vehicle having the rear wheels driven comprising, a transmission shaft, a worm gear slidable thereon, oppositely disposed clutch teeth at the ends of said worm gear, members secured to said shaft at each end of said worm and spaced therefrom also provided with clutch teeth adapted to be engaged by the teeth on said worm, a differential mechanism driven by a worm wheel gear in mesh with said worm, and driving connections to the front wheels connected to said differential mechanism.

6. A driving mechanism for a motor driven vehicle having front and rear wheels comprising, a transmission shaft extending to and driving the rear wheels, driving gears for the front wheels, shafts connected to said driving gears and extending rearwardly, a differential mechanism to which said shafts are connected and by which they are driven, and means on said transmission shaft for driving said differential mechanism constructed and arranged to be automatically disconnected momentarily when said transmission shaft is reversed.

NELS NORQUAL.

Witnesses:
I. J. GAUDER,
GEO. D. SUND.